Nov. 26, 1935.   F. C. HOWARD   2,022,349
BUMPER GUARD
Filed June 28, 1933
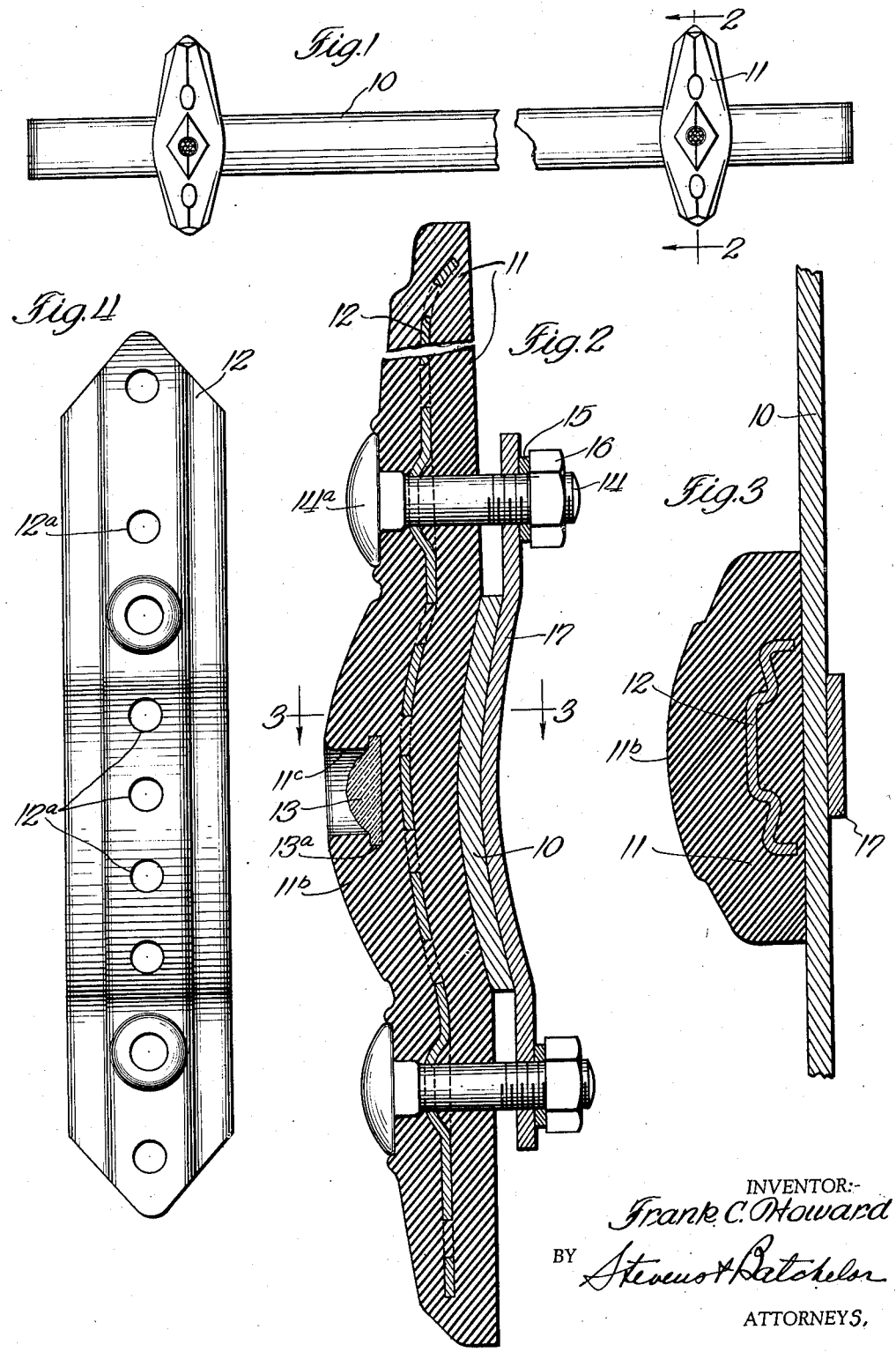
INVENTOR:-
Frank C. Howard
BY Stevens + Batchelor
ATTORNEYS.

Patented Nov. 26, 1935

2,022,349

UNITED STATES PATENT OFFICE 2,022,349

BUMPER GUARD

Frank C. Howard, Chicago, Ill., assignor to American Automatic Devices Co., Chicago, Ill., a corporation of Illinois Application June 28, 1933, Serial No. 678,095

4 Claims. (Cl. 293—55)

My invention relates to automobile bumpers, and more particularly to the guards usually secured frontally thereof to serve at points of more probable impact or collision, and my main object is to produce an improved guard of this kind in the nature of a cushion.

A further object of the invention is to build the novel guard with an internal reinforcement of steel.

A still further object of the invention is to provide an improved guard of this type having a high degree of flexibility and strength.

With the above objects in view and any others that may suggest themselves from the specification and claims to follow, a better understanding of the invention may be had by reference to the accompanying drawing, in which—

Fig. 1 is an elevation of a typical automobile bumper equipped with a pair of the novel guards;

Fig. 2 is an enlarged section on the line 2—2 of Fig. 1;

Fig. 3 is a section on the line 3—3 of Fig 2, and

Fig. 4 is an elevation of my improved reinforcing element.

Referring specifically to the drawing, 10 denotes a typical bar bumper. It is customary to equip a bumper with two guards suitably spaced so as to be located at the points of most probable impact or collision with cars or other objects in front of the bumper.

Two of the guards are shown in Fig. 1, each made up of a single piece of solid rubber 11 and vertically arranged.

In my embodiment, I mold each guard on a core 12 of channel steel, this material having a degree of flexibility, a series of perforations 12a being provided through the core to improve the flexibility and also to provide binding portions of rubber through the openings for reinforcing and strengthening the member 11.

The upper and lower portions of the body 11 of the guard are somewhat tapered in thickness, but the central portion is considerably thicker and is prominently convexed frontally as indicated at 11b. While the terminal portions may serve for impact purposes, the intermediate portion is most likely to do so, being at the center of the bumper and at the regular height to meet the bumper of another vehicle. Thus, the terminal portions serve secondarily as cushions while the thickened central portion serves primarily as such.

In the middle of the central portion 11b is a small cavity 11c in which is fitted a reflector jewel 13. This jewel is preferably green for use in a frontal bumper and red for use in a rear bumper and reflects light from other cars in the same manner as the conventional reflector buttons mounted on bumpers of many cars. In the present instance, the marginal portion 13a of the jewel is imbedded in the rubber of the central guard portion 11b dispensing with special means to mount the reflector on the bumper. The jewel is in a prominent place and easily evident to approaching or following cars.

The terminal portions of the novel guard are perforated to receive bolts 14, preferably having ornamental heads 14a and provided with washers 15 and nuts 16 to apply clamping bars or straps 17 to the bumper 10 in the fastening of the guards.

It will be evident from the above description that I have provided a guard one of the main attributes of which is its cushioning quality to prevent surfaces with which impact is made from becoming marred. At the same time the novel guard cushions the shock of impact because of its soft rubber construction. It has lasting qualities because of its internal steel reinforcement, yet this reinforcement is entirely concealed and does not detract from the ornate form which may be given the guard for the purpose of attraction. Finally, the disposition of the reflector in the guard makes for a compact combination of a guard and reflector and serves a useful purpose.

I claim:—

1. A bumper guard device comprising in combination a sheet metal bar in the form of a channel, a body of yielding material formed integrally on said bar and covering at least the major portions of the front and back faces thereof, and rigid clamping means for holding said guard bar in position in crossed relationship to a bumper bar with the back face of said body of yielding material against the front face of the bumper bar so as to make the entire body available for cushioning a blow from the front, said guard bar and said body of yielding material being of such length as to insure the end portions being spaced substantially above and below the bumper bar.

2. A bumper guard device, comprising in combination a metal bar of channel-like formation, a body of yielding material in integral form about said bar and covering at least the major portions of the front and back faces of the bar with a layer of substantial thickness, a clamping bar disposed at one side of said body of yielding material, and bolts extending through openings in said channel-like bar and through at least a portion of said body material for securing said clamping bar rigidly in position opposite said channel-like bar and in crossed relationship to a bumper bar against which one face of said body of yielding material bears.

3. A bumper guard device, comprising in combination a metal bar in the form of a channel which opens toward the bumper bar to which the device is to be attached, a body of yielding material in integral form about said bar and covering at least the major portions of the front and back faces of the bar with a layer of substantial thickness, a clamping bar disposed at the open side of said channel bar and alongside of said body of yielding material, and bolts extending through openings in said channel bar and through at least a portion of said body material for securing said clamping bar rigidly in position opposite said channel bar and in crossed gripping relationship to a bumper bar against which the face of said body of yielding material opposite the open side of said channel bar bears.

4. A bumper guard device, comprising in combination a metal bar and channel-like formation and having its middle portion longitudinally thereof bowed outwardly, a body of yielding material in integral form about said bar and covering at least the major portions of the front and back faces of the bar with a layer of substantial thickness, a clamping bar disposed opposite the concaved side of said channel-like bar and alongside of said body of yielding material, and bolts extending through openings in said channel-like bar and through at least a portion of said body material for securing said clamping bar rigidly in position opposite said channel-like bar and in crossed relationship to a bumper bar against which one face of said body of yielding material bears.

FRANK C. HOWARD.